United States Patent [19]
Bedell et al.

[11] 3,914,017
[45] Oct. 21, 1975

[54] K-SHEET TYPE POLARIZERS PREPARED FROM POLYVINYL ALCOHOL GRAFT COPOLYMERS

[75] Inventors: Stanley F. Bedell, Andover; Lloyd D. Taylor, Lexington, both of Mass.

[73] Assignee: Polaroid Corporation, Cambridge, Mass.

[22] Filed: Nov. 5, 1973

[21] Appl. No.: 412,541

[52] U.S. Cl. .... 350/154; 260/29.6 B; 260/29.7 WA; 350/147
[51] Int. Cl.² ...................... G02B 5/30; G02B 27/28
[58] Field of Search ........... 350/281, 282, 147, 154, 350/155; 260/29.6 B, 29.6 BM, 29.7 WA

[56] References Cited
UNITED STATES PATENTS

| | | | |
|---|---|---|---|
| 2,173,304 | 9/1939 | Land et al. | 350/155 |
| 2,445,555 | 7/1948 | Blinda | 350/154 |
| 2,505,084 | 4/1950 | Amon, Jr. | 350/154 |
| 3,254,561 | 6/1966 | Makas | 350/154 |
| 3,254,562 | 6/1966 | Blout | 350/154 |
| 3,386,979 | 6/1968 | Haas | 350/154 X |
| 3,531,351 | 9/1970 | Buzzell | 350/155 X |
| 3,560,075 | 2/1971 | Battista et al. | 350/154 |

FOREIGN PATENTS OR APPLICATIONS

| | | | |
|---|---|---|---|
| 553,074 | 2/1958 | Canada | 350/154 |

*Primary Examiner*—Saxfield Chatmon, Jr.
*Attorney, Agent, or Firm*—Susan M. Cooke; Esther A. H. Hopkins

[57] ABSTRACT

K-sheet type polarizers are prepared from polyvinyl alcohol graft copolymers, said graft copolymers being obtained by a redox type grafting procedure utilizing certain transition metal cation catalysts.

12 Claims, No Drawings

K-SHEET TYPE POLARIZERS PREPARED FROM POLYVINYL ALCOHOL GRAFT COPOLYMERS

BACKGROUND OF THE INVENTION

The present invention relates to dichroic light polarizers and to methods for preparing them. More particularly, this invention is concerned with K-sheet type polarizers and their preparation from polyvinyl alcohol graft copolymers obtained by a redox type grafting procedure.

As described in U.S. Pat. Nos. 2,173,304 and No. 2,306,108 issued to E. H. Land and H. G. Rogers and at pp. 56–58 of Polarized Light by W. A. Shurcliffe, K-sheet type polarizers are usually prepared by at least partially dehydrating a single polymer, generally polyvinyl alcohol. Sheets of polyvinyl alcohol, or PVA, are dehydrated by heating them, preferably in the presence of a very strong acid catalyst such as fuming HCl, to give off water molecules and are unidirectionally stretched to align the molecules. Incident light is dichroically polarized by aligned polyvinylene molecules in the resultant sheet.

One disadvantage associated with the process is the very high temperatures necessary to effect dehydration of the PVA. In addition, dehydration often occurs unevenly down the PVA chain. This may result in corresponding changes in the polarizer sheet's dichroism. More even dehydration would of course be possible if the catalysts were more uniformly distributed upon the sheet, as by incorporating them into the sheets of PVA material prior to dehydration. But the catalysts utilized in the above procedure cannot be incorporated into the sheet because they are either so strong that they easily char the surface of the sheet when applied or they volatilize at the elevated temperatures necessary for dehydration.

OBJECTS OF THE INVENTION

It is a primary object of this invention to provide K-sheet type polarizers prepared from more than one polymer. More specifically, it is an object of this invention to provide dichroic light polarizers comprising transparent sheets of a PVA graft copolymer, said graft copolymer comprising a PVA backbone onto which are grafted polymeric substituents selected from polymerized monomers having a polymerizable vinyl group on each monomer derivative and polymerized monomers having a polymerizable vinylidene group on each monomer derivative. Another object of the invention is to provide methods for preparing K-sheets from PVA graft copolymers obtained via a redox type grafting procedure.

A further object is to provide K-sheet type polarizers containing PVA material which may be dehydrated at lower temperatures than those commonly utilized in prior art procedures. A still further object is to provide K-sheets containing PVA material capable of being dehydrated in the presence of catalysts incorporated in the polarizer sheet. Other objects, features and advantages of this invention will be obvious or will appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

SUMMARY OF THE INVENTION

It has now been found that K-sheet type polarizers may be prepared from PVA graft copolymers. More specifically, K-sheet type polarizers are obtained from transparent sheets of graft copolymer comprising a PVA backbone onto which are grafted polymeric substituents selected from polymerized monomers having a polymerizable vinyl group on each monomer derivative and polymerized monomers having a polymerizable vinylidene group on each monomer derivative. Because the PVA backbone in such graft copolymers is easier to dehydrate than PVA alone, it may be dehydrated at lower temperatures and/or with acid catalysts of lesser strength. This broadens the range of catalysts which may be employed to include acids that are not volatile at the dehydration temperatures of this invention and can therefore be incorporated in the sheets of PVA material prior to dehydration.

Use of a polymer in addition to PVA for preparing K-sheet can result in other desirable properties such as less water absorption at high humidity and greater flexibility. Appropriate graft copolymers can also lower the stretch temperature required to align a polarizer, improve a polarizer's adhesion to various laminates and balance out its birefringence value to zero or nearly zero.

DETAILED DESCRIPTION OF THE INVENTION

The K-sheet type polarizers of this invention comprise transparent sheets of PVA graft copolymers, said graft copolymers comprising a PVA backbone onto which are grafted polymeric substituents being the same or different and being selected from polymerized monomers having a polymerizable vinyl group on each monomer derivative and polymerized monomers having a polymerizable vinylidene group on each monomer derivative, said PVA backbone being substantially molecularly oriented and at least partially dehydrated.

Grafting of monomers onto PVA and polymerization of these monomers to yield the desired graft copolymers may be effected by mixing together under acidic conditions a solution of PVA, polymerizable monomers and one or more transition metal cation catalysts. As explained by G. Mino and S. Kaiserman in the Journal of Polymer Science, vol. 31, pp. 242–243 (1958) and in U.S. Pat. No. 2,022,768, a transition metal cation catalyst such as ceric ion oxidizes hydroxylated carbons on a reducing agent such as PVA to hydrogen ions and transient free radicals available for grafting to a polymerizable vinyl or vinylidene carbon. When the monomer's vinyl or vinylidene carbon is added onto PVA, this free radical is transferred to the monomer to provide a site for addition of another such monomer. As this process of monomer addition and free radical site transfer is repeated, the grafted monomer becomes polymerized.

Unlike nonredox reaction catalysts which may react to a greater extent with monomer than with PVA, transition metal cation catalysts react almost exclusively with the latter to produce a very high degree of graft copolymerization and little homopolymerization. For example, while 10–20% graft copolymerization and 80–90% homopolymerization has been observed with such nonredox reaction catalysts as the persulfates, greater than 95% graft copolymerization has been observed with transition cation catalysts. Since graft copolymers rather than homopolymers are used in the preparation of K-sheet polarizers, these cations are highly desirable catalysts.

Transition metal cations found useful in the polymerization procedures of this invention comprise transition metal cations of a first oxidation state wherein each such cation possesses an oxidation potential in acidic media of at least one volt when said cation is reduced to the next lower oxidation state, said cation being stable in acidic media in both of said oxidation states. Examples of such transition metal cation catalysts include $V^{+5}$, $Ce^{+4}$, $Mn^{+3}$ and $Cr^{+6}$.

Polymerizable monomers which may be utilized in this invention have at least one polymerizable vinyl or vinylidene group on each monomer. Numerous examples of such monomers are given in columns 2 and 3 of aforementioned U.S. Pat. No. 2,922,723. Monomers found especially useful in the present invention include acrylonitrile, styrene, vinyl acetate, ethyl acrylate and methyl methacrylate. The PVA backbone to which these monomers are grafted may contain substituents other than alcoholic hydroxyl groups as long as these groups do not interfere substantially with the grafting procedure and there are a sufficient number of hydroxyl groups to allow for the conversion of at least some PVA to polyvinylene.

As mentioned above, PVA graft copolymers may be prepared by mixing a solution containing polyvinyl alcohol with one or more kinds of polymerizable monomers and a transition metal cation catalyst of a pH of less than 7 to yield an emulsion. A typical emulsion contains approximately 16–20% solids, the remainder being mostly water. If it is desired to incorporate a dehydration catalyst into the polarizer sheet, such a catalyst may be added to the resultant emulsion, a typical amount being between 1–5% by weight of the total solid content of the emulsion. This emulsion can then be cast into sheet form. Dehydration of the PVA to yield the desired polyvinylene molecules may be effected by heating the sheets, preferably in the presence of an acid catalyst if none is incorporated in the sheets.

While these sheets are being heated they are also stretched to orient the polyvinylene molecules produced by dehydration. The amount of heat required for stretching depends on the glass transition temperature of the graft composition which in turn reflects the characteristics of the graft monomers as well as the mole ratio of PVA to catalyst employed. For example, K-sheets containing such polymerized monomers are ethyl acrylate and vinyl acetate which have a low glass transition temperature can be stretched at comparatively low temperatures. Methods of stretching the sheets are described in such patents as U.S. Pat. No. 2,547,736 issued to R. Blake, U.S. Pat. No. 2,547,763 issued to E. H. Land and W. Ryan and U.S. Pat. No. 2,804,652 issued to S. Balkan. A stretch of about 3 to 4 times the original sheet length has proved satisfactory in the present invention.

The polarizer sheets may also be borated to reduce their $d_1$ value, $d_1$ being the minor principal density of a dichroic polarizer and serving as the denominator of its dichroic ratio. Boration of the relaxed sheets at 60–70°C has proven effective. Techniques and materials for carrying out this procedure are described, for example, in U.S. Pat. No. 2,445,555 issued to F. Binda.

The following examples are given to further illustrate the composition and preparation of such polarizers and are not intended to limit the invention's scope.

EXAMPLE 1

To a solution containing 55g PVA (C-20 Shimitsu or Gelvatol 1-90 Monsanto or Elvanol 71-30A Dupont) in 600 cc $H_2O$ were added 26g ethyl acrylate and 29g methyl methacrylate. Nitrogen gas was bubbled in for 1 hour, the pH was adjusted to 1.5 with conc. $HNO_3$ and 6.0g $Ce(NH_4)_2(NO_3)_6$ in 15 cc $H_2O$ were added. Stirring was continued for 3 hours at room temperature. At the end of this time the conversion of monomer to polymer was quantitative with 16% solids. The emulsion was dialyzed to a pH of 6.0 and then brought to a pH of 7.0 by the addition of a strong acid ion exchange resin which was filtered off, thereby removing $NO_3^-$ ion which has been found to inhibit polyvinylene formation. The resultant preparation of ethyl acrylate-methyl methacrylate copolymer grafted onto PVA (1/1 wt) was cast into optically clear films 2–4 mils thick. Anhydrous HCl was fumed over such a sheet at room temperature and the sheet was then stretched for 3 minutes at 90°C and borated with saturated boric acid solution for 5 minutes at 65°C. The resultant K-sheet type polarizer exhibited a dichroic ratio of 80.

EXAMPLE 2

A K-sheet type polarizer comprised of ethyl acrylate-methyl methacrylate copolymer grafted onto PVA (1/1 wt) and exhibiting approximately the same dichroic ratio as the polarizer in Example 1 was prepared in accordance with the procedure outlined in Example 1 except that the case sheet was fumed with a concentrated solution of HCl at 60°C rather than with anhydrous HCl at room temperature.

EXAMPLE 3

K-sheet type polarizers comprised of ethyl acrylate-methyl methacrylate copolymer grafted onto PVA (1/1 wt) and exhibiting approximately the same dichroic ratio as the polarizer in Example 1 were prepared in accordance with the procedure outlined in Example 1 except that phosphoric acid or p-toluenesulfonic acid were also added to the PVA graft copolymer preparation, the amount of each acid added being 1% by weight of the total weight of solids in the emulsion, and fuming of anhydrous HCl over the cast sheet was omitted.

EXAMPLE 4

The procedure described in Example 1 was followed using 55g acrylonitrile in place of the ethyl acrylate-methyl methacrylate monomer mixture to produce a K-sheet comprised of polymerized acrylonitrile grafted onto PVA (1/1 wt) with a dichroic ratio of 50.

EXAMPLE 5

A K-sheet type polarizer comprised of polymerized acrylonitrile grafted onto PVA (1/1 wt) and exhibiting approximately the same dichroic ratio as the polarizer in Example 4 was prepared in accordance with the procedure described in Example 2.

EXAMPLE 6

K-sheet type polarizers comprised of polymerized acrylonitrile grafted onto PVA (1/1 wt) and exhibiting approximately the same dichroic ratio as the polarizer in Example 4 were prepared in accordance with the procedure described in Example 3, including the addition of phosphoric acid or p-toluenesulfonic acid to the graft copolymer.

EXAMPLE 7

To a solution containing 22g PVA (C-20 Shimitsu or Gelvatol 1-90 Monsanto or Elvanol 71-30A Dupont) in 400 cc $H_2O$ were added 22g styrene. Nitrogen gas was bubbled in for 1 hour, the pH was adjusted to 1.5 conc. $HNO_3$ and the temperature was raised to 60°C. 1.6g $Ce(NH_4)_2(NO_3)_6$ in 10 cc $H_2O$ were added and stirring was continued for 2 hours at elevated temperature to yield polymerized styrene grafted onto PVA. $NO_3^-$ ion was removed and a K-sheet type polarizer comprised of polymerized styrene grafted onto PVA (1/1 wt) was prepared in accordance with the procedure described in Example 1. This polarizer exhibited a dichroic ratio of 65.

EXAMPLE 8

A K-sheet type polarizer comprised of polymerized styrene grafted onto PVA (1/1 wt) and exhibiting approximately the same dichroic ratio as the polarizer in Example 7 was prepared in accordance with the procedure described in Example 2.

EXAMPLE 9

K-sheet type polarizers comprised of polymerized styrene grafted onto PVA (1/1 wt) and exhibiting approximately the same dichroic ratio as the polarizer in Example 7 were prepared in accordance with the procedure described in Example 3, including the addition of phosphoric acid or p-toluenesulfonic acid to the graft copolymer.

As shown in the above examples, K-sheets prepared from graft copolymers of PVA may be dehydrated at lower temperatures and/or with acid catalysts of lesser strength than those required for K-sheets comprised only of PVA. This appears to be because the grafting of monomers onto PVA's secondary alcoholic carbons converts them to tertiary alcoholic carbons which are easier to dehydrate and can therefore be dehydrated at a lower temperature and/or in the presence of weaker catalysts. For example, temperatures of 60°C have been found adequate with such graft copolymers as ethyl acrylate or vinyl acetate on PVA (1/1 wt) where the polarizer sheet was fumed with a concentrated solution of hydrochloric acid and the PVA to catalyst ratio was low. This compares most favorably to dehydration temperatures of 150°–175°C recited in aforementioned U.S. Pat. Nos. 2,173,304 and 2,306,108 for K-sheets comprised solely of PVA. As shown in Examples 1, 4 and 7, K-sheet can also be fumed with an acid catalyst and then heated to a relatively low temperature to effect dehydration. When catalysts of lesser strength were incorporated into the sheet itself as in Examples 3, 6 and 9, dehydration temperatures in the range of 70°–110°C were found to be satisfactory. Since the PVA/catalyst mole ratio determines the number of grafting sites available on the PVA and hence the number of tertiary hydroxyl groups produced by grafting of a monomer at a site, this ratio will have an important influence on the ease of polyvinylene formation. Although the useful range of PVA to catalyst is broad, the preferred range lies between 100–350.

Because the tertiary carbons of PVA graft copolymers are easier to dehydrate and therefore do not require such strong acid catalyts, a wider range of such catalysts may be employed, including formic acid, phosphoric acid and p-toluenesulfonic acid, as well as aqueous solutions of potassium hydrogen sulfate and ammonium chloride which do not readily char the polarizer surface and are not volatile at the dehydration temperatures obtainable with this invention. These nonvolatile catalysts can thus be directly incorporated into graft copolymer sheets to ensure a more uniform distribution of catalyst, and therefore more uniform dehydration, than can be obtained, for example, where a volatilized catalyst is fumed over the sheet.

Use of a graft copolymer can improve other polarizer properties such as the sheet's mechanical strength, flexibility, friability and bondability. For example, when styrene which is hydrophobic is utilized as the graft material, it will decrease water absorption by the hydrophilic PVA which in turn impairs the polarizer's mechanical strength.

With regard to bondability, the rule holds true that the more similar the materials are, the better the bond between them. For example, most resins forming polarizer substrates are hydrophobic materials like polystyrene or polyesters such as polymerized butyrates. Use of a hydrophobic monomer graft, particularly one having a composition similar to that of the substrate material, insures better adhesion to the hydrophobic substrate. This is illustrated by the styrene-PVA K-sheet of Example 7 which readily bonds to a polystyrene substrate. A polystyrene dope can also be used to improve adhesion of the polarizer to the substrate. Another example of how such grafts can improve bondability can be seen in the situation where K-sheet is bonded to a sheet of methyl methacrylate. Use of a methyl methacrylate graft or of a methyl methacrylate and ethyl acrylate comonomer pair grafted to PVA is useful in improving adhesion to the sheet of methyl methacrylate.

Methyl methacrylate and ethyl acrylate may also be employed when greater flexibility of the polarizer sheet is desired. If it is considered necessary to balance out PVA's positive birefringence a graft material like styrene possessing a negative birefringence can be used. To lower the stretch temperature of the polarizer sheet, compounds such as the acrylates and polyvinyl acetate having a low glass transition temperature prove useful.

From the above examples it can be seen that the properties exhibited by PVA alone can be altered by the addition of various graft materials to obtain the desired type of K-sheet. Graft copolymers found most useful in the K-sheet type polarizers of this invention are those containing at least 20% PVA and 5% polymerized monomer by weight. To obtain a sheet wherein both polymerized monomer and PVA can effectively contribute to the properties of the polarizer, it is desirable that the sheet contain 30–80% PVA and 20–70% polymerized monomer by weight. A particularly useful graft copolymer mixture contains 50% PVA and 50% polymerized monomer by weight.

Since other substitutions and changes may be made in the above products and processes without departing from the scope of the disclosed invention, it is intended that all matters contained in the foregoing description shall be interpreted as illustrative and not in a limiting sense.

What is claimed is:

1. A dichroic light polarizer comprising a transparent sheet of a graft copolymer, said graft copolymer comprising a polyvinyl alcohol backbone onto which are grafted polymeric substituents selected from polymerized monomers having a polymerizable vinyl group on each monomer derivative polymerized monomers having a polymerizable vinylidene group on each monomer derivative and mixtures thereof, said polyvinyl alcohol backbone being substantially molecularly oriented and at least partially dehydrated.

2. The polarizer of claim 1 wherein said polymeric substituents comprise polymerized styrene.

3. The polarizer of claim 1 wherein said polymeric substituents comprise polymerized alkyl acrylate.

4. The polarizer of claim 3 wherein said alkyl acrylate comprises ethyl acrylate and methyl methacrylate.

5. The polarizer of claim 1 wherein said polymeric substituents comprise polymerized acrylonitrile.

6. The process of preparing a dichroic light polarizer comprising a transparent sheet of a graft copolymer, said graft copolymer comprising a polyvinyl alcohol backbone onto which are grafted polymeric substituents selected from polymerized monomers having a polymerizable vinyl group on each monomer derivative, polymerized monomers having a polymerizable vinylidene group on each monomer derivative, and mixtures thereof, said polyvinyl alcohol backbone being substantially molecularly oriented and at least partially dehydrated, comprising:

preparing an emulsion of said graft copolymer by mixing a solution containing said polyvinyl alcohol with said polymerizable monomers and a transition metal cation catalyst at a pH of less than 7, said cation catalyst possessing an oxidation potential in acidic media of at least one volt when said cation is reduced to the next lower oxidation state, said cation being stable in acidic media in both of said oxidation states, casting a sheet of said graft copolymer from said emulsion, heating said sheet in the presence of an acid catalyst to at least partially dehydrate said polyvinyl alcohol, and stretching said heated sheet to substantially orient the molecules of said polyvinyl alcohol.

7. The process of claim 6 wherein said transition metal cation catalyst is $Ce^{+5}$ and said acid catalyst is a concentrated solution of hydrochloric acid which is fumed upon said sheet.

8. The process of preparing a dichroic light polarizer comprising a transparent sheet of a graft copolymer, said graft copolymer comprising a polyvinyl alcohol backbone onto which are grafted polymeric substituents selected from polymerized monomers having a polymerizable vinyl group on each monomer derivative, polymerized monomers having a polymerizable vinylidene group on each monomer derivative, and mixtures thereof, said polyvinyl alcohol backbone being substantially molecularly oriented and at least partially dehydrated, comprising:

preparing an emulsion of said graft copolymer by mixing a solution containing said polyvinyl alcohol with said polymerizable monomers and a transition metal cation catalyst at a pH of less than 7, said cation catalyst possessing an oxidation potential in acidic media of at least one volt when said cation is reduced to the next lower oxidation state, said cation being stable in acidic media in both of said oxidation states, mixing said emulsion of said graft copolymer with an acid catalyst to incorporate said acid catalyst into said emulsion, casting a sheet of said graft copolymer and acid catalyst from said emulsion, heating said sheet containing said acid catalyst to at least partially dehydrate said polyvinyl alcohol, and stretching said heated sheet to substantially orient the molecules of said polyvinyl alcohol.

9. The process of claim 8 wherein said acid catalyst is phosphoric acid.

10. The process of claim 8 wherein said acid catalyst is p-toluenesulfonic acid.

11. The process of preparing a dichroic light polarizer comprising a transparent sheet of a graft copolymer, said graft copolymer comprising a polyvinyl alcohol backbone onto which are grafted polymeric substituents selected from polymerized monomers having a polymerizable vinyl group on each monomer derivative, polymerized monomers having a polymerizable vinylidene group on each monomer derivative, and mixtures thereof, said polyvinyl alcohol backbone being substantially molecularly oriented and at least partially dehydrated, comprising:

preparing an emulsion of said graft copolymer by mixing a solution containing said polyvinyl alcohol with said polymerizable monomers and a transition metal cation catalyst at a pH of less than 7, said cation catalyst possessing an oxidation potantial in acidic media of at least one volt when said cation is reduced to the next lower oxidation state, said cation being stable in acidic media in both of said oxidation states, casting a sheet of said graft copolymer from said emulsion, contacting said sheet with an acid catalyst and then heating said sheet to at least partially dehydrate said polyvinyl alcohol, and stretching said heated sheet to substantially orient the molecules of said polyvinyl alcohol.

12. The process of claim 11 wherein said acid catalyst is anhydrous hydrochloric acid which is fumed upon said sheet.

* * * * *